Nov. 21, 1961 G. E. KIMBER 3,009,216
SEALING STRIP
Filed Feb. 4, 1960
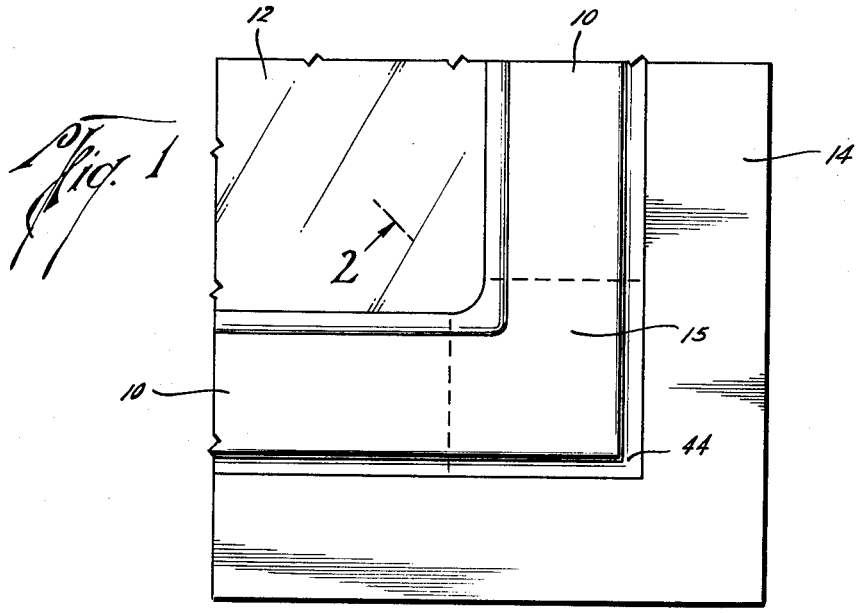
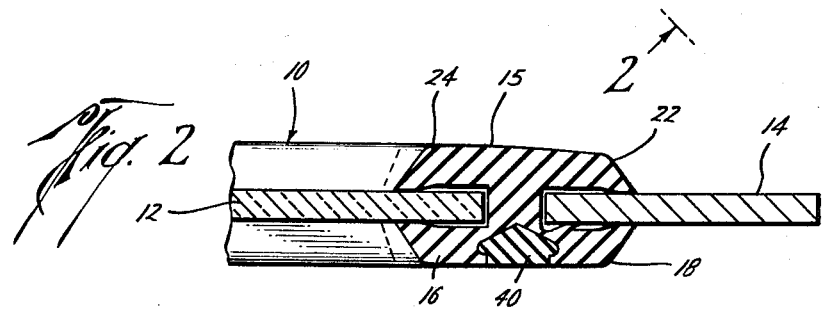
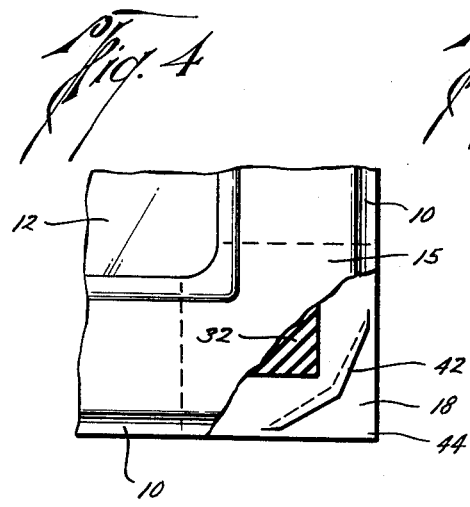
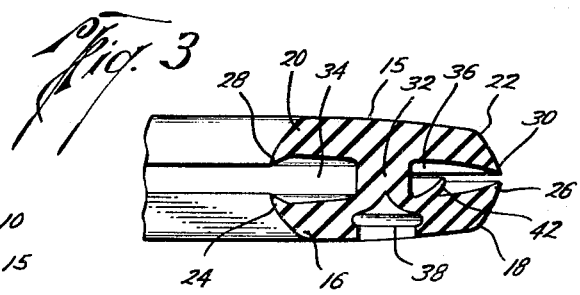
George E. Kimber
INVENTOR.
BY
ATTORNEY

United States Patent Office 3,009,216
Patented Nov. 21, 1961

3,009,216
SEALING STRIP
George E. Kimber, Houston, Tex., assignor to
F. H. Maloney Company
Filed Feb. 4, 1960, Ser. No. 6,760
11 Claims. (Cl. 20—56.4)

This invention relates to wall panel construction, and more particularly to devices for sealingly joining panels used in building wall construction.

Elastomeric connector strips have in the past been developed and widely used for sealingly mounting and cushioning panels, such as plate glass or window glass, in a wall of a building, or in automobile bodies. Such connector strips generally comprise an elongated elastomeric body having grooves therein for receiving the edges of glass and/or metal sheets to be joined. One form of these connectors is shown in U.S. Patent 2,878,535, and includes a wedge-shaped member insertable in a wedge-receiving recess whereby the elastomeric material is crowded to cause the grooves to engage the glass or metal sheets more tightly. Other forms known in the art include a cylindrical wedge insertable in a cylindrical groove for the same purpose.

Such connector strips provide a weather tight mounting for wall panels along the length of such panels, since the wedge forces the strip into tight engagement with the panel, thereby preventing air or water from passing around the edge of the panel. However, the wedge is less effective at the corners of panels, where two sections of the connector strip must be joined at right angles, so that leaks often occur at such corners.

It is accordingly an object of this invention to provide a sealing strip for the connection of panels in edge-to-edge relation which provides improved sealing at the corners of such panels.

It is another object to provide a corner connector for joining panels in edge-to-edge relation which effectively resists the passage of air and water around the edges of such panels.

The accomplishment of these and other objects will become more apparent upon consideration of the following description and the accompanying drawing, wherein FIGURE 1 depicts a panel joined to a structural frame member by means of one of the sealing strips of this invention, FIGURE 2 is a sectional view taken at line 2—2 of FIGURE 1, FIGURE 3 is a sectional view of an embodiment of the member of this invention, as it appears prior to installation, and FIGURE 4 is a view of an embodiment of the sealing strip of this invention installed on the corner of a panel, part of the sealing strip being broken away.

Referring now to the drawing, FIGURE 1 shows a pair of sealing strips 10 installed at right angles to each other on the edges of a panel 12, such as for example a glass panel. On the opposite side the strips are mounted on a frame member 14, generally of aluminum or other metal.

Sealing strips 10 are elongated strips, usually made of natural or synthetic rubber or other elastomeric material, which extend down the edges of panel 12, and are formed around the corner of the panel in a corner portion. This corner portion may be a separate member 15 vulcanized or otherwise attached to a pair of sealing strips 10, or may be molded integrally therewith.

As best seen in FIGURE 3, the sealing strips 10, including the corner portion, are formed in a generally H-shaped cross section, a pair of generally parallel portions being formed by inner wings 16, 20 and outer wings 18, 22, and a web 32 forming the cross member of the H. Inner wings 16, 20 terminate at their inner edges in inwardly directed lips 24, 28, and form an inner channel 34 having an increasing width toward the lips. Outer wings 18, 22 terminate at their outer edges in inwardly directed lips 26, 30, and form an outer channel 36 having a decreasing width toward the lips. Inner channel 34 has a width substantially equal to the thickness of panel 12, whereby lips 24, 28 will sealingly engage the panel, and channel 36 has a width substantially equal to frame member 14, whereby lips 26, 30 will sealingly engage the frame member.

A wedge receiving recess 38 is disposed longitudinally of the sealing strip substantially along the axis of web 32, and, in the embodiment shown, is substantially V-shaped, to receive a wedge 40, as shown in FIGURE 2. The sealing strip is installed by sliding outside channel 36 onto the inside edge and inside corner of frame member 14. Wing 16 is then bent back so that panel 12 may be fitted into channel 34, the corner of the panel fitting into the corner portion of the sealing strip. Wedge 40 is then inserted into recess 38, thereby forcing wing 16 toward the panel so that inside lips 24, 28 sealingly engage the panel.

It will be noted that at the outside corner 44 of the sealing strip, outside lips 26, 30 are not forced into as tight engagement with frame member 14 as at other points along the length of the sealing strip, because this portion of the lip is further removed from the web 32 and from the wedge 40 than at other places. Consequently there is a tendency for air and water to leak around the panel edge at this corner.

According to the present invention such leakage is effectively prevented by providing on the wing 18 forming one wall of outer channel 36 a lip 42 extending transversely of a line extending through the panel corner and the frame corner, i.e. extending across the corner. This lip is directed outwardly, toward the lips 26, 30 at the outer edge of the outer channel, so that when in contact with the panel member, the transverse lip will prevent air or water from leaking around the edge of the panel. A preferred form of the transverse lip 42 is as shown in FIGURE 4, where it is in the form of a wide V, the apex of which is directed toward the outside corner of the sealing strip, and the sides of which approach the respective adjoining edges of the sealing strip. Such a form provides better sealing around the corner than a straight lip extending at a 45° angle across the corner, since wider coverage is provided. However, such a 45° angle form may be used, as well as other forms which provide an outwardly directed lip extending across the corner.

The construction of this invention may be used in any panel construction where sealing strips are used to support and sealingly engage flat panels, and where the sealing strip must pass around a corner, either a right angle corner or a more acute or obtuse corner. Such construction is used not only in building wall construction, but also in the installation of windows in automobiles and aircraft.

It will be understood that the sealing strips, including the corner portions are installed with the transverse lip 42 on the weather side of the panel, whereby wind blowing on the wall panel will cause the transverse lip to seal against the panel or frame member to prevent leakage around its edge. The portion of wing 18 which cannot be held in close contact with frame member 14 by means of wedge 40 is thereby provided with means for sealing against leakage.

Although specific embodiments of the invention are shown and described herein, the invention is not limited to these embodiments, but only as set forth by the following claims:

1. In wall panel construction wherein a panel is sealingly supported in a frame member by an elongated elastomeric sealing member having an H-shaped cross-section with oppositely disposed channels which each sealingly engage one edge of said panel and of said frame member, and wherein said sealing strip extends around a corner of said panel so that an outside corner is formed on said sealing strip, the improvement which comprises providing a transverse lip in the outside channel of said sealing strip across said corner.

2. Wall panel construction as defined by claim 1 wherein the transverse lip is formed on one wall of the outside channel and is directed toward said outside corner.

3. An elastomeric sealing strip corner portion for sealingly engaging a corner of a building construction panel and a corresponding inside corner of a frame member, comprising a pair of generally parallel portions including inner and outer wings, a web member connecting said wings in a generally H-shaped cross-section providing an inner channel having a width substantially equal to the thickness of the panel and an outer channel having a width substantially equal to the thickness of the frame member, said wings terminating in lips inwardly directed toward each other for sealing against said panel and said frame member, and a lip formed on the inner surface of one of said outer wings and extending transversely of a line extending through said panel corner and said frame corner.

4. An elastomeric sealing strip corner member as defined by claim 3 wherein the last-named lip is directed toward the other lips of said outer channel.

5. In wall panel construction wherein a panel is sealingly supported in a frame member by an elongated elastomeric sealing member having an H-shaped cross-section with oppositely disposed channels which each sealingly engage one edge of said panel and of said frame member, and wherein said sealing strip extends around a corner of said panel so that an outside corner is formed on said sealing strip, the improvement which comprises providing a transverse lip in the outside channel of said sealing strip across said corner, said transverse lip being formed on one wall of the outside channel in the form of a wide V whose apex is directed toward said outside corner and whose sides approach the respective outer edges of the sealing strip.

6. An elastomeric sealing strip corner portion for sealingly engaging a corner of a building construction panel and a corresponding inside corner of a frame member, comprising a pair of generally parallel portions including inner and outer wings, a web member connecting said wings in a generally H-shaped cross-section providing an inner channel having a width substantially equal to the thickness of the panel and an outer channel having a width substantially equal to the thickness of the frame member, said wings terminating in lips inwardly directed toward each other for sealing against said panel and said frame member, and a lip formed on the inner surface of one of said outer wings and extending transversely of a line extending through said panel corner and said frame corner, said lip being in the shape of a wide V, the apex of which is outwardly directed and substantially on said line, and the sides of which approach the lip of the wing on which the transverse lip is formed.

7. An elongate elastomeric sealing member having a longitudinally extending channel therein adapted to receive the edge of a structural element, oppositely disposed longitudinally extending means for engaging another structural element, a corner formed by two portions of said sealing member joined in end to end relationship with the said channel on the outside of the corner, and a transverse lip formed on one wall of said channel extending across said corner.

8. A sealing member as defined by claim 7 wherein the transverse lip is in the form of a wide V whose apex is directed toward said outside corner and whose sides approach the respective outer edges of said sealing member.

9. A sealing member as defined by claim 8 wherein the transverse lip is outwardly directed.

10. An elongate elastomeric sealing member having first longitudinally extending means thereon adapted to sealingly engage a first structural element and around an outside corner thereof, and second longitudinally extending means adapted to sealingly engage a second structural element, said second means comprising a channel into which the edge of the second element fits and a transverse lip formed on one wall of said channel extending substantially diagonally across the corner.

11. A sealing member as defined by claim 10 wherein the transverse lip is in the form of a wide V whose apex is directed toward the outside corner and whose sides approach the respective outer edges of said sealing member.

References Cited in the file of this patent

UNITED STATES PATENTS

| | | |
|---|---|---|
| 2,764,786 | Flemming | Oct. 2, 1956 |
| 2,892,658 | Peras | June 30, 1959 |